Aug. 26, 1952 C. E. BARKALOW 2,608,001
INDICATING INSTRUMENT

Filed Sept. 10, 1947 4 Sheets-Sheet 1

INVENTOR
CLARE E. BARKALOW
BY
Herbert H. Thompson
ATTORNEY.

Aug. 26, 1952     C. E. BARKALOW     2,608,001
INDICATING INSTRUMENT
Filed Sept. 10, 1947     4 Sheets-Sheet 2
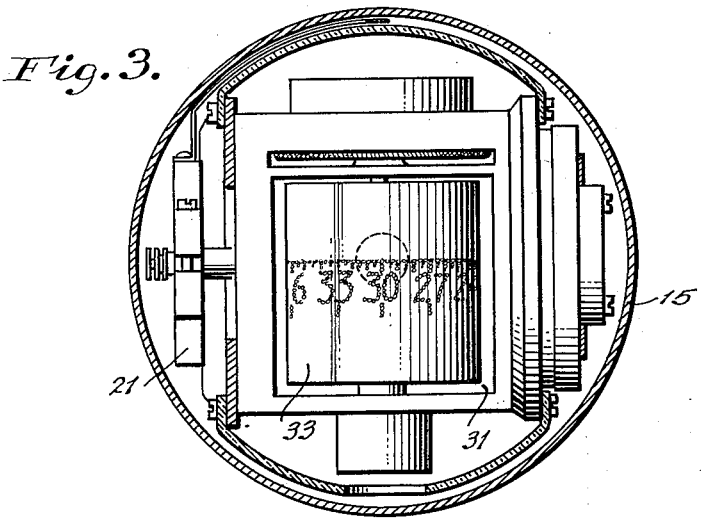
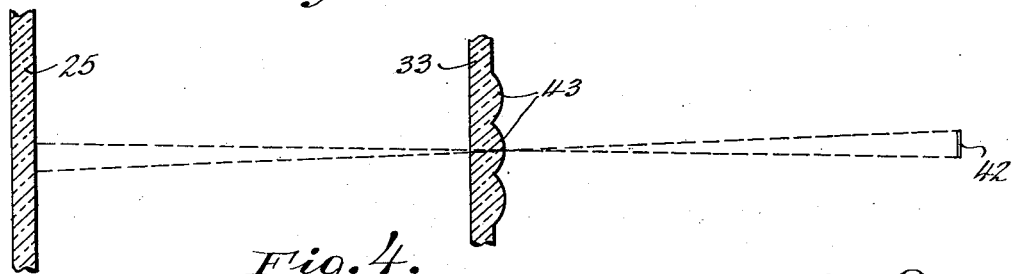
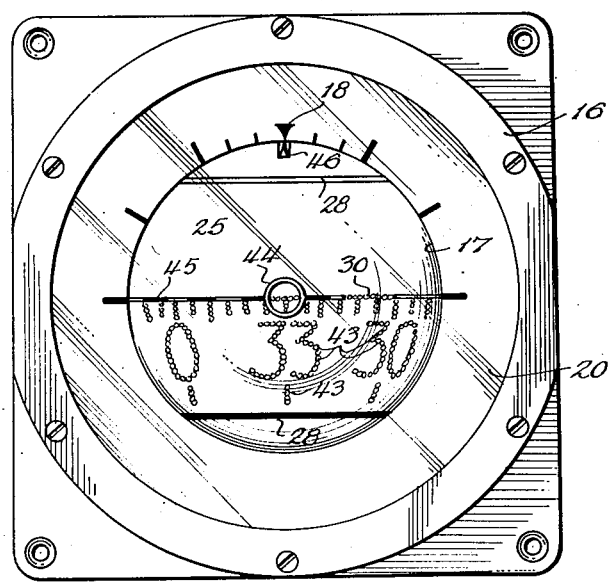
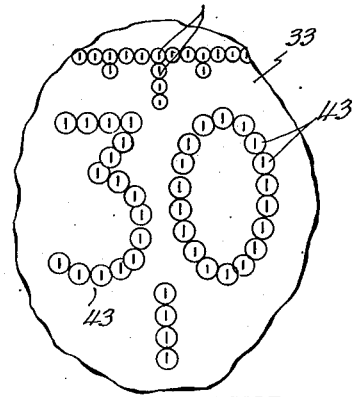
INVENTOR
CLARE E. BARKALOW
BY
Herbert H. Thompson
ATTORNEY.

Aug. 26, 1952 C. E. BARKALOW 2,608,001
INDICATING INSTRUMENT

Filed Sept. 10, 1947 4 Sheets-Sheet 3

INVENTOR
CLARE E. BARKALOW
BY
Herbert W. Thompson
ATTORNEY.

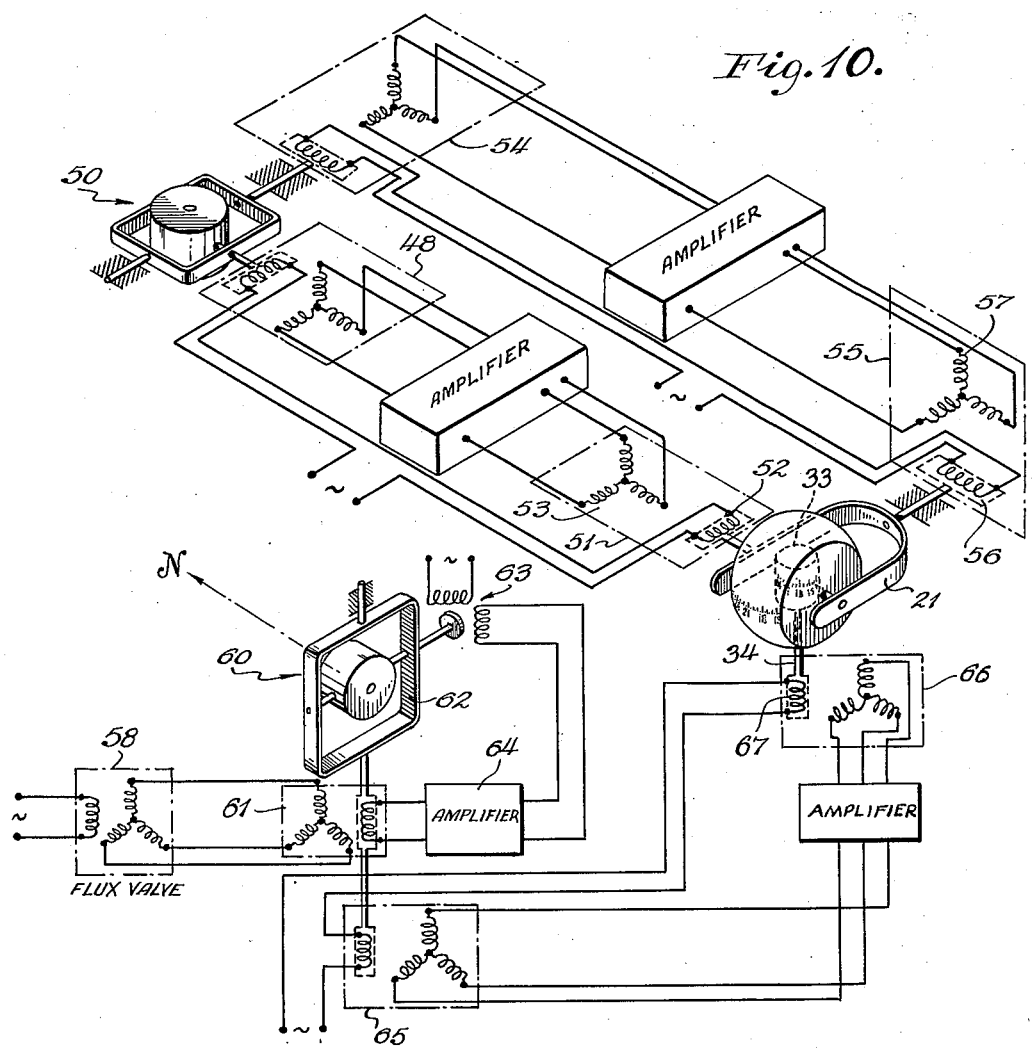

Patented Aug. 26, 1952

2,608,001

UNITED STATES PATENT OFFICE 2,608,001

INDICATING INSTRUMENT

Clare E. Barkalow, Huntington, N. Y., assignor to The Sperry Corporation, a corporation of Delaware Application September 10, 1947, Serial No. 773,218

8 Claims. (Cl. 33—204)

This invention relates to an indicating instrument representing on one dial the attitude of a dirigible craft relative to the earth about the pitch, roll, and azimuth or vertical axes of the craft. The invention pertains to an instrument of this character in which the indicia is visible on the exterior surface of a generally spherical member or shell.

One of the features of the present invention is in the provision of a horizontal bar at the window of the instrument readable on the pitch scale or indicia that includes a lubber's line or reference thereon that is readable on the azimuth indicia.

A further feature of the invention is provided by a lubber's line for azimuth indication formed in the shape of a ring.

The improved instrument also includes the combination of a light source, a movable member with indicia thereon in the form of a plurality of lenses, and a translucent screen in the focus of a number of lenses on which the indicia appears as a corresponding number of images of the light source. The member is light transmissive and is situated so that the light from the source is projected through the same on the screen.

Another feature of the invention resides in provision of an instrument of this character with a translucent member having azimuth indicia thereon in the form of a plurality of lenses.

Still another feature of the invention is in the provision of an instrument of this character having a translucent screen on which azimuth indicia are projected that is stabilized about two mutually perpendicular, normally horizontal, axes.

This invention also relates to the novel features or principles of the instrumentalities described herein, whether or not such are used for the stated objects, or in the stated fields or combinations.

Other features and structural details of the invention will be apparent from the following description when read in relation to the accompanying drawings wherein:

Fig. 3 is a front elevation of the instrument shown in Figs. 1 and 2 with the casing and screen of the instrument in section.

Fig. 4 is a front elevation of the instrument shown in Figs. 1, 2 and 3. In this figure, a part of the right hand portion of the horizontal bar is broken away to show the location of the indicia line in back of the same.

Fig. 5 is a schematic view showing the light projecting system of the form of the invention shown in Figs. 1 to 4, inclusive.

Fig. 6 is an enlarged detail view of a part of the azimuth indicia member shown in Figs. 1 to 4 inclusive.

Fig. 10 is a schematic view and wiring diagram showing a system for determining the position of the azimuth indicia member about its axis, and for stabilizing the screen of the instrument about its mutually perpendicular, normally horizontal, axes.

Figure 1:
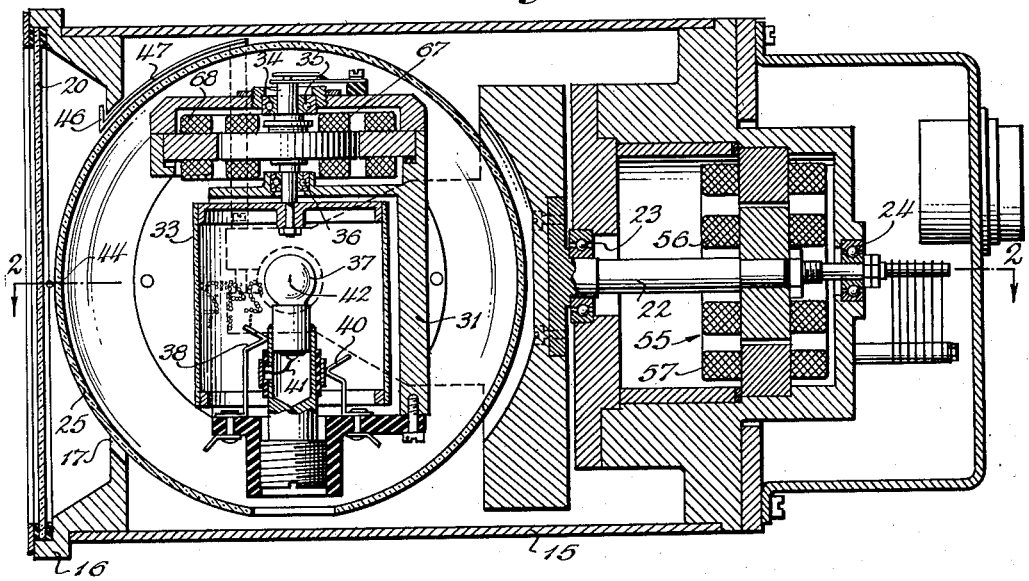
Fig. 1 is a vertical section of an instrument constructed in accordance with the present inventive concepts.

With particular reference to Figs. 1 to 6, inclusive, an instrument embodying the present inventive concepts is shown to include a casing 15 that may be mounted on the instrument panel (not shown) of a dirigible craft with the front wall 16 thereof visible to the pilot of the craft as shown in Fig. 4. Wall 16 has a circular aperture or open window 17 therein with a roll scale 18 at the periphery thereof. As shown, the front wall of the instrument is closed by a glass window 20.

Figure 2:
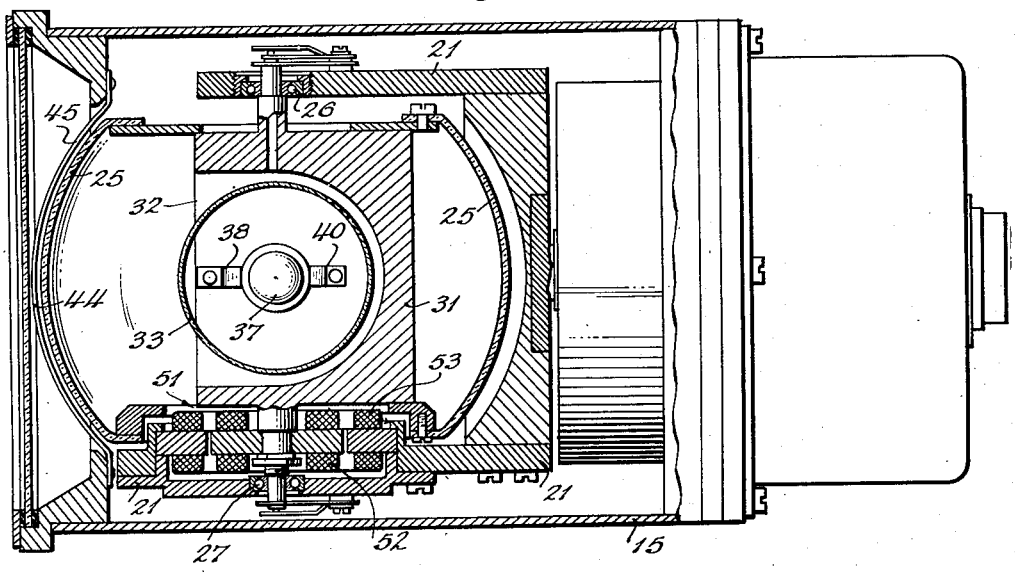
Fig. 2 is a section taken on line 2—2, Fig. 1.

With particular reference to Figs. 1, 2 and 3, the construction interiorly of the casing 15 is shown to include an open-ended gimbal ring 21 having a rearwardly extending trunnion 22. The trunnion 22 is pivotally mounted within the casing 15 by means of axially spaced bearings 23 and 24. The axis of ring 21 defined by the bearings 23 and 24 is parallel to or coincident with the normally horizontal fore and aft or roll axis of the craft. In the casing 15, a translucent screen 25 in the form of a generally spherical shell is pivotally mounted on the ring 21 by means of bearings 26, 27 for movement about a horizontal axis substantially parallel to or coincident with the pitch axis of the craft. Pitch indicia in the form of a latitude scale 28 and an artificial horizon line 30, Fig. 4, are situated on the exterior of the translucent screen or shell 25. Shell 25 with the pitch scale thereon is visible to the pilot through the opening 17.

As shown in the form of invention illustrated in Fig. 2, shell 25 is fixed to a mounting 31 with trunnions thereon that engage the bearings 26 and 27. One end of the mounting 31 is open as indicated at 32. Mounting 31 pivotally supports a cylindrically shaped light transmissive member 33 with freedom about a normally vertical axis in shell 25. As shown in Fig. 1, a stub shaft 34 fixed to the top of member 33 engages axially spaced bearings 35 and 36 on the mounting 31 providing the noted arrangement. A light source in the form of a lamp 37 is situated within the hollow member 33, the lamp being shown as fixed to the base of the mounting 31 by means of a threaded plug. Electrical contacts 38 and 40 and lead 41 provide an electrical circuit for supplying electrical energy from a suitable source (not shown) for lighting the lamp 37. The filament 42 of the lamp 37 is situated along the vertical axis of the member 33 at the center of the spherical shell 25 so that the same is equidistant from all the visible portion of the shell.

As particularly shown in Figs. 3, 4 and 6, member 33 has azimuth indicia in the form of an arrangement of a plurality of lenses indicated at 43. The indicia in this instance are situated about the internal periphery of the hollow cylindrical shell 33. As shown in Fig. 5, the lenses 43 have a focal length equal to half the distance between the member 33 and the screen 25, as the image of the light source and the light source are conjugate foci of the lenses, so that the portion of the azimuth indicia between the light source and visible part of the screen appears on the screen as an image of the light source for each of the lenses. The lamp 37 projects the azimuth indicia on the member 33 to the translucent screen 25 and the same appears thereon as shown in Fig. 4. It will be understood that azimuth indicia extend around the periphery of member 33 and that the indicia projected by the light source depend on the azimuth position of the compass card providing member 33. As shown in Fig. 4, the instrument indicates the craft to have an azimuth heading of 330 degrees. The azimuth indicia of the compass card member include numerical compass representations as well as vertical line representations. The projected compass indicia are read on a lubber's mark formed in the shape of a ring indicated at 44 in Fig. 4. The lubber's mark 44 defines the outline of an open area in which the azimuth indicia are readable apart from the attitude indications of the instrument. As shown, ring 44 is formed as the central part of a normally horizontal bar 45 that is readable at the window on the pitch scale 28 and horizon line 30 on the screen 25. Bar 45 may be fixedly connected to the casing 21 at the respective ends thereof, as shown in Fig. 2. The indication provided by the instrument in pitch in Fig. 4 shows the craft to be flying level toward the horizon. Bar 45 and mark 44 provide an index member extending across the window of the instrument having a central azimuth indicating portion and pitch indicating side portions.

A roll reference 46 is read in connection with scale 18 to indicate the position of the craft about its roll axis. This reference is connected to ring 21 by means of bar 47. The indication in roll provided by the instrument, Fig. 4, shows that the craft is not inclined about its fore and aft axis. Due to the fact that mounting 31 is fixed to shell 25 in this form of the invention, when the craft dives at an angle steeper than 35 degrees the projected azimuth indicia disappear from the screen.

The instrument includes means for stabilizing the screen 25 about both its pitch and roll axes. The means provided in this connection may be a pair of self-synchronous data transmission systems of the character shown in Fig. 10 of the drawing. As shown, the pitch control system may include a selsyn data transmitter 48 at the pitch axis of a gyro vertical 50 and a selsyn receiver 51. In Fig. 2, the stator 53 of the receiver 51 is fixed to the ring 21 and the rotor 52 is connected to the mounting 31. Similarly, the roll control system may include a selsyn data transmitter 54 at the roll axis of the gyro vertical 50 and a selsyn receiver 55. In Fig. 1, the rotor 56 of the receiver 55 is mounted on the trunnion 22 of ring 21 and the stator 57 is connected to the casing 15 of the instrument. In this type of system, the gyro vertical 50 provides a stable reference to which the screen is slaved about both its normally horizontal, mutually perpendicular axes as defined by bearings 23, 24 and bearings 26, 27. The roll reference 46 being mounted on ring 21 is positioned by the roll stabilizing means.

As particularly shown in Fig. 10, the light transmissive member 33 of the instrument is positioned about the axis thereof defined by bearings 35, 36 by means responsive to the earth's magnetic field. This means may take the form of a directional gyro slaved to a flux valve with a further self-synchronous data transmission system from the vertical ring of the gyro to the member 33. In this figure, the flux valve is indicated at 58 and the directional gyro is indicated at 60. The gyro is slaved to the flux valve in a conventional manner by means of the output of a selsyn signal generator 61 whose rotor is fixed to the vertical ring 62 of the gyro. The output of generator 61 is fed to torque motor 63 by way of amplifier 64 to precess the ring 62 so that the spin axis of the rotor of the gyro is always directed in a north-south plane under control of the flux valve. The data transmitting system for repeating the azimuth reference provided by the gyro at the member 33 may include a selsyn data transmitter 65 whose rotor is connected to vertical ring 62 of the directional gyro. The receiver selsyn for this system is indicated at 66. As shown in Fig. 1, the rotor 67 of receiver 66 is connected to stub shaft 34. The stator 68 of the receiver 66 is fixedly mounted on the mounting 31 of the instrument. The portion of the member 33 observable on the screen 25 thus depends on the particular heading of the craft on which the instrument is employed.

Figure 7:
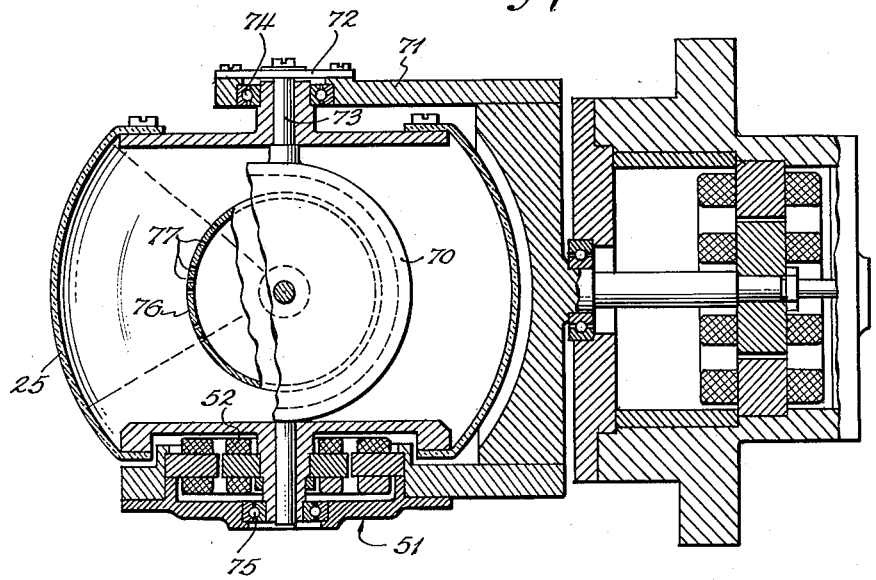
Fig. 7 is a view similar to Fig. 2 showing a modified form of the invention.
Figure 8:
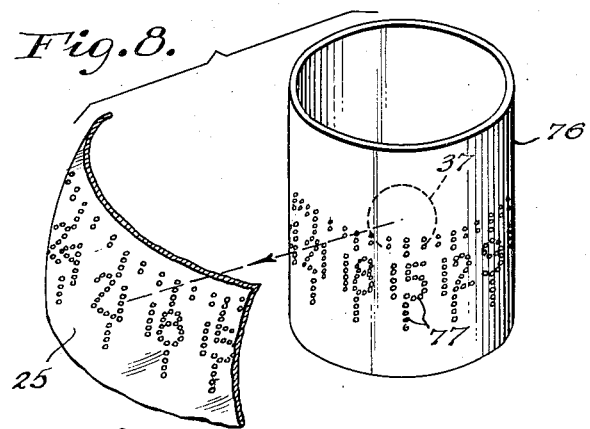
Fig. 8 is a detail perspective view of the screen and azimuth indicia member shown in Fig. 7.

Fig. 7 shows a modification of the invention in which the mounting 70 for the light source is fixedly connected to the gimbal ring 71 of the instrument by a fastening plate 72 having a trunnion 73 connected thereto that extends from and forms a part of the mounting 70. In this construction, the screen 25 of the instrument is made movable independently of the mounting 70. It is noted that, in Fig. 2, the screen 25 and mounting 31 form one piece. In the modified construction, screen 25 is pivotally mounted about an axis defined by the bearings 74, 75 that is concentric with the axis of the fixed trunnion 73. In this showing, the rotor 52 of the receiver 51 is fixedly connected to the screen 25 of the instrument to stabilize the same. The light transmissive member illustrated in Fig. 7 is indicated at 76, the member being opaque and having azimuth indicia thereon in the form of a plurality of pinhole openings 77 as clearly shown in Fig. 8. Light from the source 37, in this instance, passes directly through the pinhole openings 77 in member 76 and appears on the screen in the form of azimuth indicia as indicated in Fig. 8.

Figure 9:
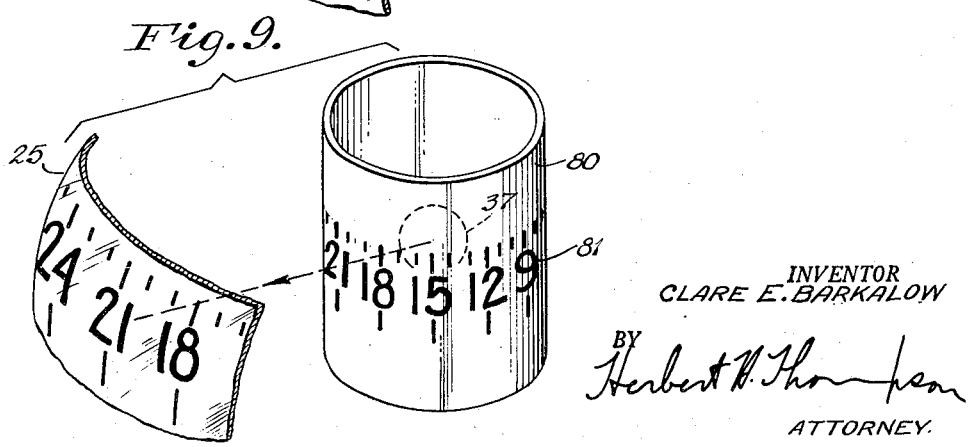
Fig. 9 is a view similar to Fig. 8 showing a further type of screen and indicia member.

A further modified structure is shown in Fig. 9 of the drawing. In this instance, the light transmissive member indicated at 80 is constructed of translucent material and the azimuth indicia 81 thereon are made opaque. In this arrangement, the light source casts a shadow of the indicia 81 that are readable on the screen 25 as clearly shown in Fig. 9.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pitch, roll and azimuth indicating instrument for dirigible craft comprising a casing fixed to the craft having a window with a roll scale on its periphery, a translucent screen in the casing in the form of a generally spherical shell visible at the window and movable about axes substantially parallel to the pitch and roll axes of the craft, means operable to stabilize the screen about its pitch axis, means operable to stabilize the screen about its roll axis, a roll reference positioned by said roll stabilizing means readable on the roll scale, a pitch scale on the shell including an artificial horizon line, a light source within the shell, a light transmissive member with freedom about a normally vertical axis in the shell having azimuth indicia thereon, said light source projecting the azimuth indicia on the member to a portion of the screen visible at the window, a normally horizontal bar at the window readable on the pitch scale and horizon line including a lubber's mark thereon readable on the projected azimuth indicia, and means responsive to the earth's magnetic field for positioning the member about its axis.

2. An attitude indicating instrument for dirigible craft comprising a casing fixed to the craft having a window, a translucent screen in the casing in the form of a generally spherical shell visible at the window and movable about axes substantially parallel to the pitch and roll axes of the craft, means operable to stabilize the screen about its pitch axis, means operable to stabilize the screen about its roll axis, a light source within the shell, a light transmissive member with freedom about a normally vertical axis in the shell having azimuth indicia thereon, said light source normally projecting the azimuth indicia on the member to a portion of the screen visible at the window, a lubber's mark at the window readable on the projected indicia, and means responsive to the earth's magnetic field for positioning the member about its axis.

3. An azimuth indicating instrument for dirigible craft comprising a casing fixed to the craft having a window in the rear wall of the same relative to the craft, a translucent screen in the casing in the form of a generally spherical shell visible at the window and movable about an axis, means operable to stabilize the screen about its axis, a light source within the shell, a light transmissive member with freedom about a normally vertical axis in the shell having azimuth indicia thereon, said light source projecting the azimuth indicia on the screen, a lubber's mark at the window readable on the projected indicia, and means responsive to the earth's magnetic field for positioning the member about its axis.

4. An azimuth indicating instrument including a casing having a window therein, a translucent screen in the casing visible at the window and movable about an axis, means operable to stabilize the screen about its axis, a light source, a light transmissive member pivotally mounted in said casing situated between the light source and screen having azimuth indicia thereon, said light source projecting the azimuth indicia on the screen, a lubber's mark at the window readable on the projected indicia, and means responsive to the earth's magnetic field for positioning the member about its axis.

5. An instrument as claimed in claim 1, in which the lubber's mark is a ring situated at the center of the horizontal bar.

6. An instrument as claimed in claim 4, in which the azimuth indicia on said member are formed of a plurality of lenses with focal lengths of half the distance between the member and the screen.

7. In an azimuth indicating instrument, a casing having a window therein, a translucent screen in the casing visible at the window, a pivoted member in the casing having azimuth indicia thereon in the form of a plurality of lenses with focal lengths equal to half the distance between the member and screen, and a light source in the casing at the focal point of the lenses for projecting azimuth indicia on the screen.

8. In an azimuth instrument, the combination of, a casing, a light source in the casing, a member pivoted in the casing with azimuth indicia thereon in the form of a plurality of lenses, a translucent screen in the casing in the focus of a number of the lenses on which the azimuth indicia appears as a corresponding number of images of the light source, and means responsive to the earth's magnetic field for positioning the member.

CLARE E. BARKALOW.

REFERENCES CITED

The following references are of record in the file of this patent:

UNITED STATES PATENTS

| Number | Name | Date |
|---|---|---|
| 966,267 | Swensson | Aug. 2, 1910 |
| 1,107,901 | Colombel | Aug. 18, 1914 |
| 1,503,509 | Kramer | Aug. 5, 1924 |
| 1,993,864 | Sperry | Mar. 12, 1935 |
| 2,019,234 | Nistri | Oct. 29, 1935 |
| 2,080,490 | Kollsman | May 18, 1937 |
| 2,116,217 | Schwarz | May 3, 1938 |
| 2,192,148 | Otto | Feb. 27, 1940 |
| 2,222,627 | Naecker | Nov. 26, 1940 |
| 2,260,396 | Otto | Oct. 28, 1941 |
| 2,392,494 | Murtagh et al. | Jan. 8, 1946 |

FOREIGN PATENTS

| Number | Country | Date |
|---|---|---|
| 117,641 | Great Britain | Aug. 1, 1918 |
| 714,972 | France | Sept. 14, 1931 |